(12) United States Patent
Chen et al.

(10) Patent No.: US 8,564,542 B2
(45) Date of Patent: Oct. 22, 2013

(54) MULTI-TOUCH DETECTING METHOD FOR DETECTING LOCATIONS OF TOUCHED POINTS ON A TOUCH PANEL

(75) Inventors: Po-Yang Chen, Miao-Li County (TW); Po-Sheng Shih, Miao-Li County (TW)

(73) Assignee: Chimei Innolux Corporation, Miao-Li County (TW)

(*) Notice: Subject to any disclaimer, the term of this patent is extended or adjusted under 35 U.S.C. 154(b) by 776 days.

(21) Appl. No.: 12/826,585

(22) Filed: Jun. 29, 2010

(65) Prior Publication Data

US 2011/0007027 A1    Jan. 13, 2011

(51) Int. Cl.
*G06F 3/045* (2006.01)

(52) U.S. Cl.
USPC .......................................... 345/171; 345/173

(58) Field of Classification Search
USPC .................................. 345/173, 174
See application file for complete search history.

(56) References Cited

U.S. PATENT DOCUMENTS 5,825,352 A * 10/1998 Bisset et al. ................ 345/173
2005/0209392 A1   9/2005 Luo et al.
2006/0097991 A1   5/2006 Hotelling et al.
2008/0158181 A1   7/2008 Hamblin et al.
2011/0248932 A1* 10/2011 Wu et al. .................... 345/173

FOREIGN PATENT DOCUMENTS

TW    200920689 A    5/2009

* cited by examiner

*Primary Examiner* — Latanya Bibbins
(74) *Attorney, Agent, or Firm* — WPAT, PC; Justin King

(57) ABSTRACT

A multi-touch detecting method is adapted for detecting touched points on a touch panel that includes first and second conductive films. The first conductive film exhibits electric anisotropy, and has a lower resistivity in a first direction. The multi-touch detecting method includes: applying a first voltage to the first conductive film; applying a second voltage greater than the first voltage to the second conductive film; measuring sequentially voltages at different measuring points of the first conductive film; obtaining a first local maximum voltage, a second local maximum voltage and a local minimum voltage from the measured voltages; determining a first location of the touched points based on a location of the measuring point corresponding to the first local maximum voltage; and determining a second location of the touched points based on a location of the measuring point corresponding to the second local maximum voltage.

14 Claims, 8 Drawing Sheets

MULTI-TOUCH DETECTING METHOD FOR DETECTING LOCATIONS OF TOUCHED POINTS ON A TOUCH PANEL

BACKGROUND

1. Technical Field

The present disclosure relates to a multi-touch detecting method for detecting locations of touched points on a touch panel, and more particularly to a multi-touch detecting method involving the use of at least one conductive film exhibiting electric anisotropy as a part of a touch sensor.

2. Description of Related Art

Touch panels are widely used in electronic products, such as mobile phones and navigation systems, for example, to serve as input devices. A new trend of touch panel technology is towards having a touch panel with multi-touch detection capability. There are several types of touch panels including resistive type, capacitive type, infrared type, and surface acoustic wave type, for example. Conventional resistive type touch panels do not support multi-touch detection. When multiple points on a resistive type touch panel are touched, the location of the touched points cannot be correctly determined. Conventional capacitive type touch panels, such as those disclosed in U.S. Patent Application Publication Nos. 2006/0097991 and 2008/0158181, can support multi-touch detection. However, the detecting method for determining the locations of multiple touched points on the capacitive type touch panel is complicated.

SUMMARY OF THE INVENTION

According to one aspect of the present disclosure, there is provided a multi-touch detecting method adapted for detecting touched points on a touch panel. The touch panel includes first and second conductive films insulated from each other and coupled electrically to each other through touch. The first conductive film exhibits electric anisotropy, and has a lower resistivity in a first direction. The multi-touch detecting method comprises: applying a first voltage to the first conductive film; applying a second voltage greater than the first voltage to the second conductive film; measuring sequentially voltages at different measuring points of the first conductive film; obtaining a first local maximum voltage, a second local maximum voltage and a local minimum voltage from the voltages measured at the different measuring points of the first conductive film, the measuring point corresponding to the local minimum voltage being located between the measuring point corresponding to the first local maximum voltage and the measuring point corresponding to the second local maximum voltage; determining a first location of the touched points in a second direction transverse to the first direction based on a location of the measuring point corresponding to the first local maximum voltage in the second direction; and determining a second location of the touched points in the second direction based on a location of the measuring point corresponding to the second local maximum voltage in the second direction.

According to another aspect of this disclosure, there is provided a multi-touch detecting method adapted for detecting touched points on a touch panel. The touch panel includes first and second conductive films insulated from each other and coupled electrically to each other through touch. The second conductive film exhibits electric anisotropy, and has a lower resistivity in a certain direction. The multi-touch detecting method comprises: applying a first voltage to the first conductive film; applying a second voltage greater than the first voltage to the second conductive film; measuring sequentially voltages at different measuring points of the second conductive film; obtaining a first local minimum voltage, a second local minimum voltage and a local maximum voltage from the voltages measured at the different measuring points of the second conductive film, the measuring point corresponding to the local maximum voltage being located between the measuring point corresponding to the first local minimum voltage and the measuring point corresponding to the second local minimum voltage; determining a first location of the touched points based on a location of the measuring point corresponding to the first local minimum voltage; and determining a second location of the touched points based on a location of the measuring point corresponding to the second local minimum voltage.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

Reference will now be made to the drawings to describe various embodiments in detail.

Figure 1:
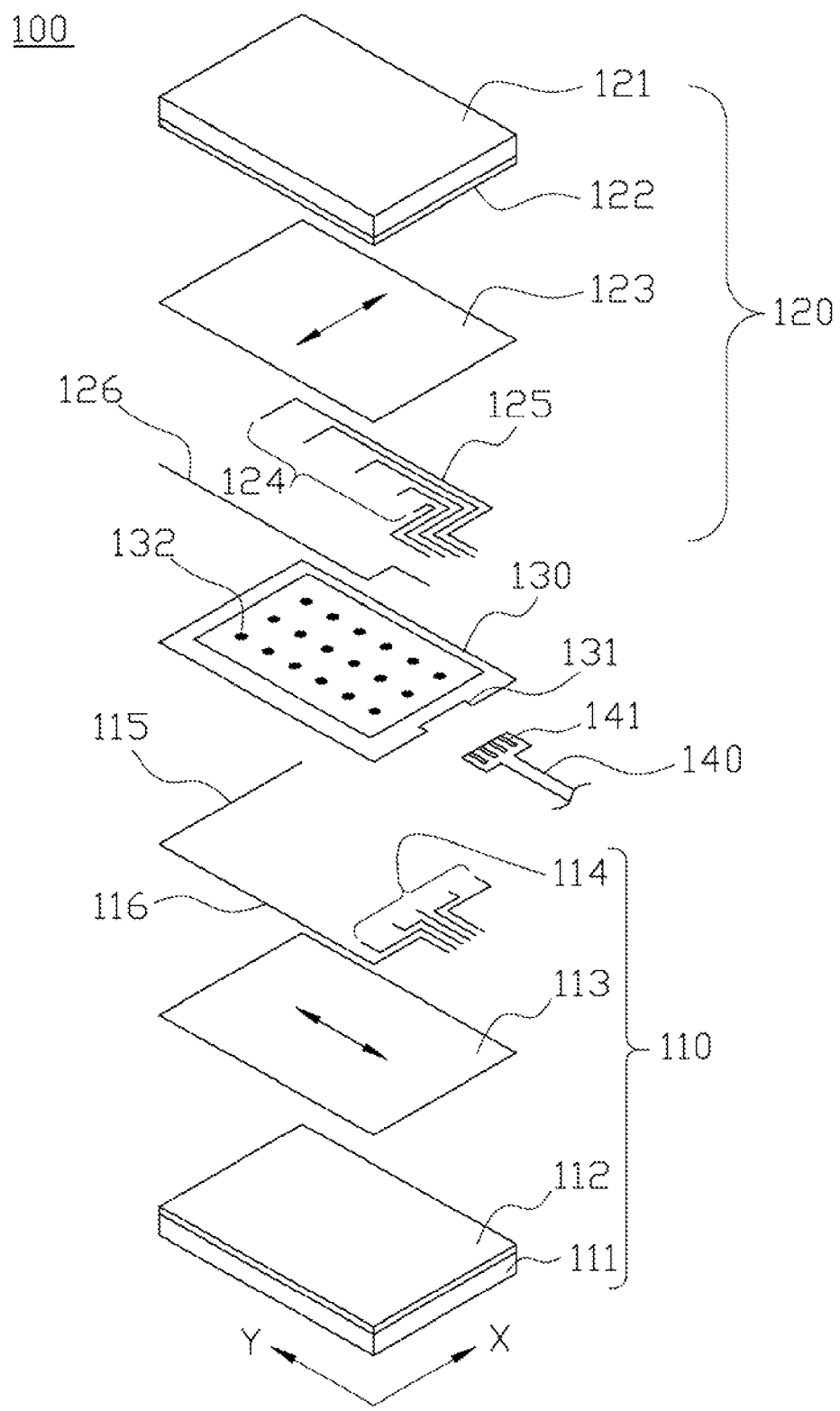
FIG. 1 is an exploded perspective view of a touch panel in which the exemplary embodiment of a multi-touch detecting method of the present disclosure is to be implemented.

Referring to FIG. 1, the exemplary embodiment of a multi-touch detecting method of the present disclosure is implemented in a touch panel 100. The touch panel 100 includes a first layer 110, a second layer 120, an adhesive film 130, a plurality of spacers 132 of an insulator, and a flexible print circuit (FPC) 140. The adhesive film 130 extends along sides of the first and second layers 110, 120, securely bonds the first and second layers 110, 120 together, and is formed with a recess 131 that receives the flexible print circuit 140. The spacers 132 are disposed between the first and second layers 110, 120, and serve to separate and thus insulate the first and second layers 110, 120.

The first layer 110 includes a first substrate 111, a first conductive film 113, an adhesive film 112, a first electrode 115, a plurality of second electrodes 114, and a plurality of conductive lines 116. The first conductive film 113 is disposed on the first substrate 111, and is bonded securely to the first substrate 111 through the adhesive film 112. The first conductive film 113 exhibits electric anisotropy, has a lower resistivity in a first direction (Y), and further has two sides (not labeled) opposite to each other in the first direction (Y). The first electrode 115 is disposed at one of the sides of the first conductive film 113, and is coupled electrically to the aforesaid one of the sides of the first conductive film 113. The second electrodes 114, such as sensing electrodes, are uniformly disposed along the other of the sides of the first conductive film 113, and are coupled electrically to different measuring points of the other of the sides of the first conductive film 113. The conductive lines 116 extend respectively from the first and second electrodes 115, 114 towards one of the sides of the first layer 110 in which the recess 131 of the adhesive film 130 is formed. It is noted that the number of second electrodes 114 employed in the exemplary embodiment shown in FIG. 1 is illustrative only and can be adjusted according to actual requirements.

The second layer 120 includes a second substrate 121, a second conductive film 123, an adhesive film 122, a third electrode 126, a plurality of fourth electrodes 124, such as sensing electrodes, and a plurality of conductive lines 125. The second conductive film 123 is disposed on the second substrate 121, is bonded securely to the second substrate 121 through the adhesive film 122, and is juxtaposed with the first conductive film 113 in a face-to-face manner. The second conductive film 123 exhibits electric anisotropy, has a lower resistivity in a second direction (X) transverse to the first direction (Y), and further has two sides (not labeled) opposite to each other in the second direction (X). The third electrode 126 is disposed at one of the sides of the second conductive film 123, and is coupled electrically to the aforesaid one of the sides of the second conductive film 123. The fourth electrodes 124, such as sensing electrodes, are uniformly disposed along the other side of the second conductive film 123, and are coupled electrically to different measuring points of the other of the sides of the second conductive film 123. The conductive lines 125 extend respectively from the third and fourth electrodes 126, 124 towards one of the sides of the second layer 120 in which the recess 131 of the adhesive film 130 is formed. It is noted that the number of fourth electrodes 124 employed in the exemplary embodiment shown in FIG. 1 is illustrative only and can be adjusted according to actual requirements.

The flexible print circuit 140 is provided with a plurality of metal pads 141 coupled electrically to the conductive lines 116, 125, respectively, and serves to transmit electric signals from an external source (not shown) through the conductive lines 116, 125 to the first, second, third, and fourth electrodes 115, 114, 126, 124, and vice versa.

Each of the first and second substrates 111, 121 can be made from a transparent material, such as polyethylene (PE), polycarbonate (PC), polyethylene terephthalate (PET), polymethyl methacrylate (PMMA), or glass. Each of the adhesive films 130, 112, 122, can be made from a thermal-cured adhesive or a UV-cured adhesive.

Each of the first and second conductive films 113, 123 is manufactured by, e.g., a method disclosed in Taiwanese Publication No. 200920689. The first conductive film 113 is made from a nanomaterial that has strings of interconnected carbon nanounits, with each string substantially extending in the first direction (Y). The structure of the first conductive film 113 permits the first conductive film 113 to have the lower resistivity in the first direction (Y) and a higher resistivity in the second direction (X) which is 50 to 350 times greater than the lower resistivity in the first direction (Y). In other words, the first conductive film 113 has an electric anisotropy ratio ranging from 50 to 350. The second conductive film 123 is made from a nanomaterial that has strings of interconnected carbon nanounits, with each string substantially extending in the second direction (X). The structure of the second conductive film 123 permits the second conductive film 123 to have the lower resistivity in the second direction (X) and a higher resistivity in the first direction (Y) which is 50 to 350 times greater than the lower resistivity in the second direction (X). In other words, the second conductive film 123 has an electric anisotropy ratio ranging from 50 to 350. Each of the first and second conductive films 113, 123 has a surface resistivity ranging from 1 kilohms per squre to 800 kilohms per squre. Each of the first and second conductive films 113, 123 can, e.g., have an electric anisotropy ratio ranging from 100 to 200.

The exemplary embodiment of the multi-touch detecting method of the present disclosure is adapted for detecting touched points, such as the points touched by a user, on the touch panel 100, and includes: applying a first voltage to the sides of the first conductive film 113 through the first and second electrodes 115, 114, respectively; applying a second voltage greater than the first voltage to the sides of the second conductive film 123 through the third and fourth electrodes 126, 124, respectively; measuring sequentially voltages at the different measuring points of the first conductive film 113 through the second electrodes 114; obtaining a first local maximum voltage, a second local maximum voltage and a local minimum voltage from the voltages measured at the different measuring points of the first conductive film 113, the measuring point corresponding to the local minimum voltage being located between the measuring point corresponding to the first local maximum voltage and the measuring point corresponding to the second local maximum voltage; determining a first location of the touched points in the second direction (X) based on a location of the measuring point corresponding to the first local maximum voltage in the second direction (X); determining a second location of the touched points in the second direction (X) based on a location of the measuring point corresponding to the second local maximum voltage in the second direction (X); measuring sequentially voltages at the different measuring points of the second conductive film 123 through the fourth electrodes 124; obtaining a first local minimum voltage, a second local minimum voltage and a local maximum voltage from the voltages measured at the different measuring points of the second conductive film 123, the measuring point corresponding to the local maximum voltage being located between the measuring point corresponding to the first local minimum voltage and the measuring point corresponding to the second local minimum voltage; determining a first location of the touched points in the first direction (Y) based on a location of the measuring point corresponding to the first local minimum voltage in the first direction (Y); and determining a second location of the touched points in the first direction (Y) based on a location of the measuring point corresponding to the second local minimum voltage in the first direction (Y). It is noted that the exemplary embodiment is a non-limiting example and the multi-touch detecting method of the exemplary embodiment can be extended to a detection of more than two touched points.

For example, in the measuring steps, the voltages are measured in such a manner that while each of the measuring points is measured, the first voltage is applied to the rest of the measuring points of the other of the sides of the first conductive film 113 and the second voltage is applied to the rest of the measuring points of the other of the sides of the second conductive film 123, in order to eliminate an adverse effect on the measuring point being measured caused by the rest of the measuring points and to thereby improve the accuracy of the measured voltage at the measuring point being measured.

When the touch panel 100 is not touched, the first and second conductive films 113, 123 are insulated from each other, and the voltages measured at the second electrodes 114 are all equal to the first voltage, while the voltages measured at the fourth electrodes 124 are all equal to the second voltage. When two points on the touch panel 100 are touched, the first and second conductive films 113, 123 are coupled electrically to each other at the touched points, and the voltages at the corresponding second electrodes 114 corresponding to the touched points rise above the first voltage (see FIGS. 2 and 3), while the voltages at the corresponding fourth electrodes 124 corresponding to the touched points drop below the second voltage (see FIGS. 4 and 5).

Figure 2:
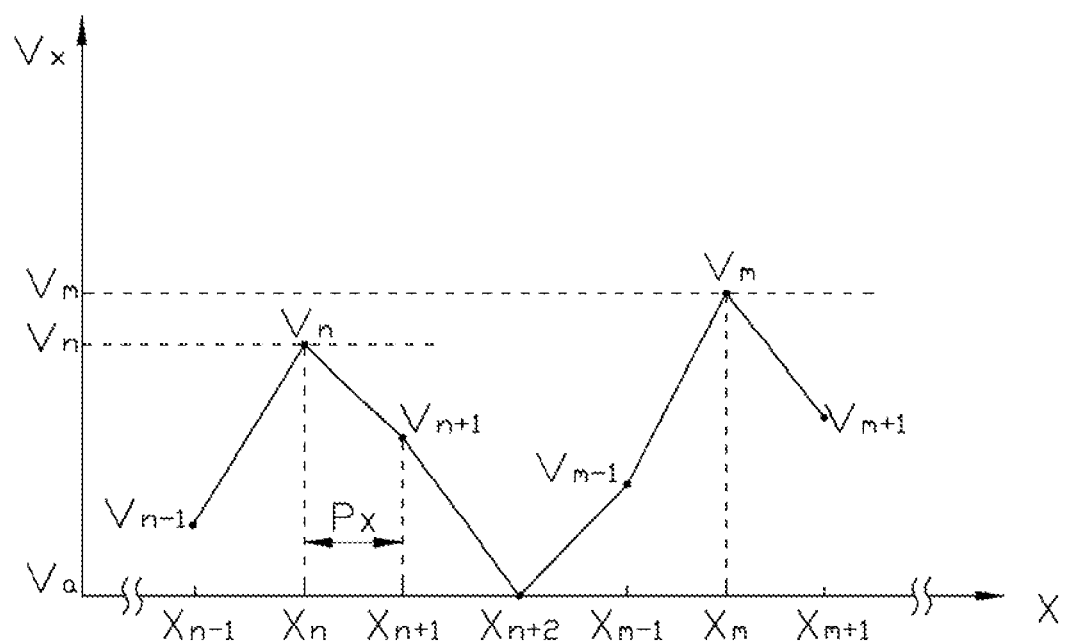
FIG. 2 is a plot of voltages measured at measuring points of a first conductive film of the touch panel along a certain direction in response to a two-point touch in which two points on the touch panel are touched and are distant from each other in the certain direction.

When the touched points are distant from each other, the response of the voltages at the corresponding second electrodes 114 and the corresponding fourth electrodes 124 corresponding to the two touched points on the touch panel 100 follows a pattern different from that of the voltages at the corresponding second electrodes 114 and the corresponding fourth electrodes 124 when the touched points are close to each other. Hence, the determination of the locations of the touched points in the first direction (Y) or in the second direction (X) will be based on one set of equations when the touched points are distant from each other, and on a different set of equations when the touched points are close to each other. Details of such determinations are as follows:

Referring to FIG. 2, in combination with FIG. 1, assuming that the first local maximum voltage $V_n$ is measured at the $n^{th}$ measuring point of the first conductive film 113, that the second local maximum voltage $V_m$ is measured at the $m^{th}$ measuring point of the first conductive film 113, and that n≥2, and n≥n+3, which represents that the touched points are distant from each other in the second direction (X), the first location of the touched points in the second direction (X) $X_a$ is determined by one of the following equations according to a respective one of the following conditions:

$$\text{if } V_{n-1} < V_{n+1}, \text{ then } X_a = X_n + \frac{P_x}{2} \times \frac{V_{n+1} - V_{n-1}}{V_n - V_{n-1}};$$

$$\text{if } V_{n-1} = V_{n+1}, \text{ then } X_a = X_n; \text{ and}$$

$$\text{if } V_{n-1} > V_{n+1}, \text{ then } X_a = X_n + \frac{P_x}{2} \times \frac{V_{n+1} - V_{n-1}}{V_n - V_{n+1}};$$

where $V_{n-1}$ is the voltage measured at the $n-1^{th}$ measuring point of the first conductive film 113, $V_{n+1}$ is the voltage measured at the $n+1^{th}$ measuring point of the first conductive film 113, $X_n$ is the location of the $n^{th}$ measuring point of the first conductive film 113 in the second direction (X), and $P_x$ is a distance between two adjacent ones of the measuring points of the first conductive film 113.

In addition, the second location of the touched points in the second direction (X) $X_b$ is determined by one of the following equations according to a respective one of the following conditions:

$$\text{if } V_{m-1} < V_{m+1}, \text{ then } X_b = X_m + \frac{P_x}{2} \times \frac{V_{m+1} - V_{m-1}}{V_m - V_{m-1}};$$

$$\text{if } V_{m-1} = V_{m+1}, \text{ then } X_b = X_m; \text{ and}$$

$$\text{if } V_{m-1} > V_{m+1}, \text{ then } X_b = X_m + \frac{P_x}{2} \times \frac{V_{m+1} - V_{m-1}}{V_m - V_{m+1}};$$

where $V_{m-1}$ is the voltage measured at the $m-1^{th}$ measuring point of the first conductive film 113, $V_{m+1}$ is the voltage measured at the $m+1^{th}$ measuring point of the first conductive film 113, and $X_m$ is the location of the $m^{th}$ measuring point of the first conductive film 113 in the second direction (X).

Figure 3:
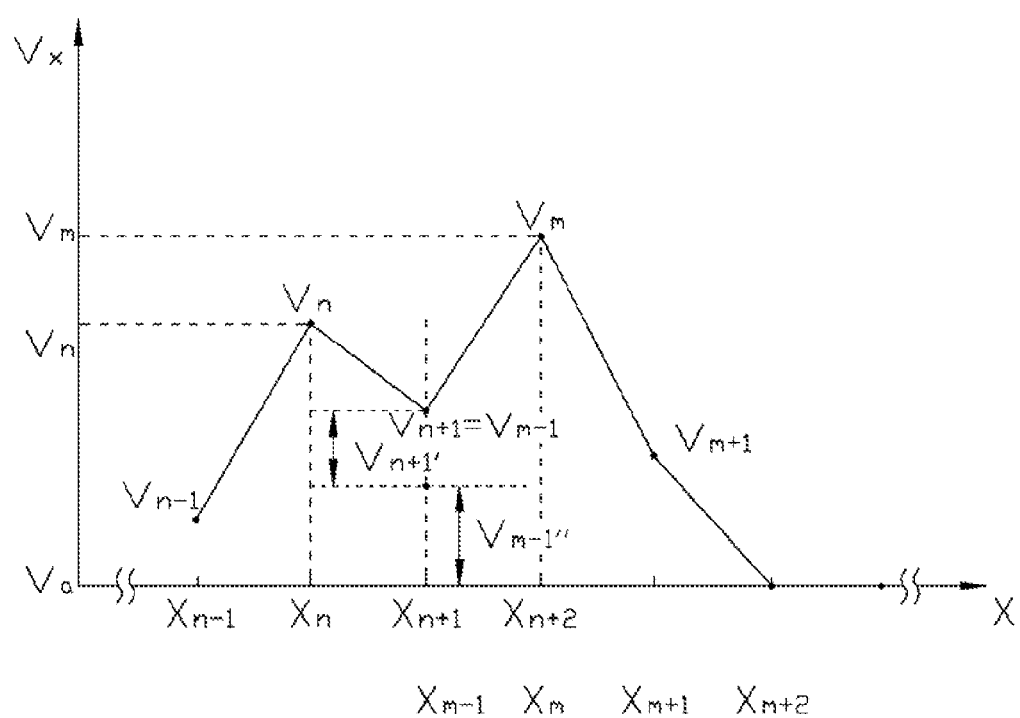
FIG. 3 is a plot of voltages measured at measuring points of the first conductive film of the touch panel along a certain direction in response to a two-point touch in which two points on the touch panel are touched and are close to each other in the certain direction.

Referring to FIG. 3, in combination with FIG. 1, assuming that m=n+2, which represents that the touched points are close to each other in the second direction (X), and that the local minimum voltage $V_{n+1}$ (=$V_{m-1}$) is measured at the $n+1^{th}$, i.e., $m-1^{th}$, measuring point of the first conductive film 113, and can be separated into $V_{n+1}'$ and $V_{m-1}''$ as functions of ($V_a$, $V_{n-1}$, $V_n$, $V_{n+1}$, $V_m$, $V_{m+1}$) defined below, the first location of the touched points in the second direction (X) $X_a$ and the second location of the touched points in the second direction (X) $X_b$ are determined by the following equations according to respective ones of the following conditions:

$$V_{n+1}' = (V_{n+1} - V_a) \times \frac{(V_n - V_a) \times (V_n - V_{n-1})}{(V_n - V_a) \times (V_n - V_{n-1}) + (V_m - V_a) \times (V_m - V_{m+1})} + V_a;$$

$$V_{m-1}'' = (V_{n+1} - V_a) \times \frac{(V_m - V_a) \times (V_m - V_{m+1})}{(V_n - V_a) \times (V_n - V_{n-1}) + (V_m - V_a) \times (V_m - V_{m+1})} + V_a;$$

$$\text{if } V_{n-1} < V_{n+1}', \text{ then } X_a = X_n + \frac{P_x}{2} \times \frac{V_{n+1}' - V_{n-1}}{V_n - V_{n-1}};$$

$$\text{if } V_{n-1} = V_{n+1}', \text{ then } X_a = X_n;$$

$$\text{if } V_{n-1} > V_{n+1}', \text{ then } X_a = X_n + \frac{P_x}{2} \times \frac{V_{n+1}' - V_{n-1}}{V_n - V_{n+1}'};$$

$$\text{if } V_{m-1}'' < V_{m+1}, \text{ then } X_b = X_m + \frac{P_x}{2} \times \frac{V_{m+1} - V_{m-1}''}{V_m - V_{m-1}''};$$

$$\text{if } V_{m-1}'' = V_{m+1}, \text{ then } X_b = X_m; \text{ and}$$

$$\text{if } V_{m-1}'' > V_{m+1}, \text{ then } X_b = X_m + \frac{P_x}{2} \times \frac{V_{m+1} - V_{m-1}''}{V_m - V_{m+1}};$$

where $V_a$ is the first voltage.

Figure 4:
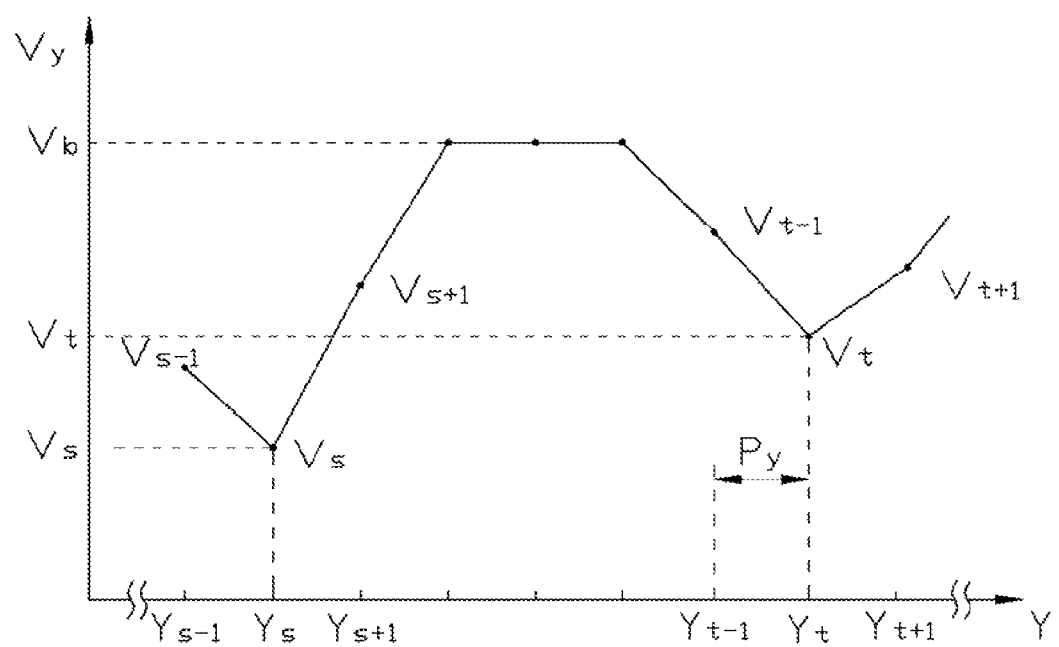
FIG. 4 is a plot of voltages measured at measuring points of a second conductive film of the touch panel along a certain direction in response to a two-point touch in which the two points on the touch panel are touched and are distant from each other in the certain direction.

Referring to FIG. 4, in combination with FIG. 1, assuming that the first local minimum voltage $V_s$ is measured at the $s^{th}$ measuring point of the second conductive film 123, the second local minimum voltage $V_t$ is measured at the $t^{th}$ measuring point of the second conductive film 123, and that s≥2, and t≥s+3, which represents that the touched points are distant from each other in the first direction (Y), the first location of the touched points in the first direction (Y) $Y_a$ is determined by one of the following equations according to a respective one of the following conditions:

$$\text{if } V_{s-1} < V_{s+1}, \text{ then } Y_a = Y_s + \frac{P_y}{2} \times \frac{V_{s-1} - V_{s+1}}{V_{s+1} - V_s};$$

$$\text{if } V_{s-1} = V_{s+1}, \text{ then } Y_a = Y_s; \text{ and}$$

$$\text{if } V_{s-1} > V_{s+1}, \text{ then } Y_a = Y_s + \frac{P_y}{2} \times \frac{V_{s-1} - V_{s+1}}{V_{s-1} - V_s};$$

where $V_{s-1}$ is the voltage measured at the s-1$^{th}$ measuring point of the second conductive film 123, $V_{s-1}$ is the voltage measured at the s+1$^{th}$ measuring point of the second conductive film 123, $Y_s$ is the location of the s$^{th}$ measuring point of the second conductive film 123 in the first direction (Y), and $P_y$ is a distance between two adjacent ones of the measuring points of the second conductive film 123.

In addition, the second location of the touched points in the first direction (Y) $Y_b$ is determined by one of the following equations according to a respective one of the following conditions:

$$\text{if } V_{t-1} < V_{t+1}, \text{ then } Y_b = Y_t + \frac{P_y}{2} \times \frac{V_{t-1} - V_{t+1}}{V_{t+1} - V_t};$$

$$\text{if } V_{t-1} = V_{t+1}, \text{ then } Y_b = Y_t; \text{ and}$$

$$\text{if } V_{t-1} > V_{t+1}, \text{ then } Y_b = Y_t + \frac{P_y}{2} \times \frac{V_{t-1} - V_{t+1}}{V_{t-1} - V_t};$$

where $V_{t-1}$ is the voltage measured at the t-1$^{th}$ measuring point of the second conductive film 123, $V_{t+1}$ is the voltage measured at the t+1$^{th}$ measuring point of the second conductive film 123, and $Y_t$ is the location of the t$^{th}$ measuring point of the second conductive film 123 in the first direction (Y).

Figure 5:
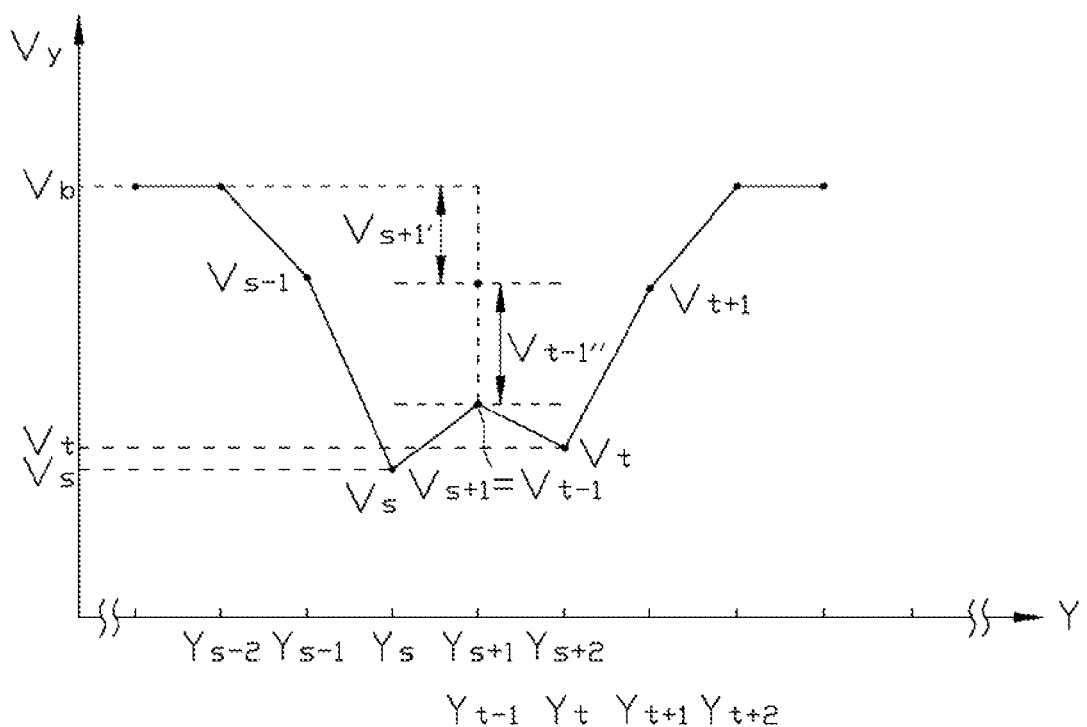
FIG. 5 is a plot of voltages measured at measuring points of the second conductive film of the touch panel along a certain direction in response to a two-point touch in which two points on the touch panel are touched and are close to each other in the certain direction.

Referring to FIG. 5, in combination with FIG. 1, assuming that t=s+2, which represents that the touched points are close to each other in the first direction (Y), and that the local maximum voltage $V_{s+1}$ ($=V_{t-1}$) is measured at the s+1$^{th}$, i.e., t-1$^{th}$, measuring point of the second conductive film 123, and can be separated into $V_{s+1}'$ and $V_{t-1}''$ as functions of ($V_b, V_{s-1}, V_s, V_{s+1}, V_t, V_{t+1}$) defined below, the first location of the touched points in the first direction (Y) $Y_a$ and the second location of the touched points in the first direction (Y) $Y_b$ are determined by the following equations according to respective ones of the following conditions:

$$V'_{s+1} = V_b - (V_b - V_{s+1}) \times \frac{(V_b - V_s) \times (V_{s-1} - V_s)}{(V_b - V_s) \times (V_{s-1} - V_s) + (V_b - V_t) \times (V_{t+1} - V_t)};$$

$$V''_{t-1} = V_b - (V_b - V_{s+1}) \times \frac{(V_b - V_t) \times (V_{t+1} - V_t)}{(V_b - V_s) \times (V_{s-1} - V_s) + (V_b - V_t) \times (V_{t+1} - V_t)};$$

$$\text{if } V_{s-1} < V'_{s+1}, \text{ then } Y_a = Y_s + \frac{P_y}{2} \times \frac{V_{s-1} - V'_{s+1}}{V'_{s+1} - V_s};$$

$$\text{if } V_{s-1} = V'_{s+1}, \text{ then } Y_a = Y_s;$$

$$\text{if } V_{s-1} > V'_{s+1}, \text{ then } Y_a = Y_s + \frac{P_y}{2} \times \frac{V_{s-1} - V'_{s+1}}{V_{s-1} - V_s};$$

$$\text{if } V''_{t-1} < V_{t+1}, \text{ then } Y_b = Y_t + \frac{P_y}{2} \times \frac{V''_{t-1} - V_{t+1}}{V_{t+1} - V_t};$$

$$\text{if } V''_{t-1} = V_{t+1}, \text{ then } Y_b = Y_t; \text{ and}$$

$$\text{if } V''_{t-1} > V_{t+1}, \text{ then } Y_b = Y_t + \frac{P_y}{2} \times \frac{V''_{t-1} - V_{t+1}}{V''_{t-1} - V_t};$$

where $V_b$ is the second voltage.

As described above, the locations of the touched points in the first and second directions (Y, X) can be determined. Exemplary functions provided by the multi-touch detecting method are described below.

Figure 6:
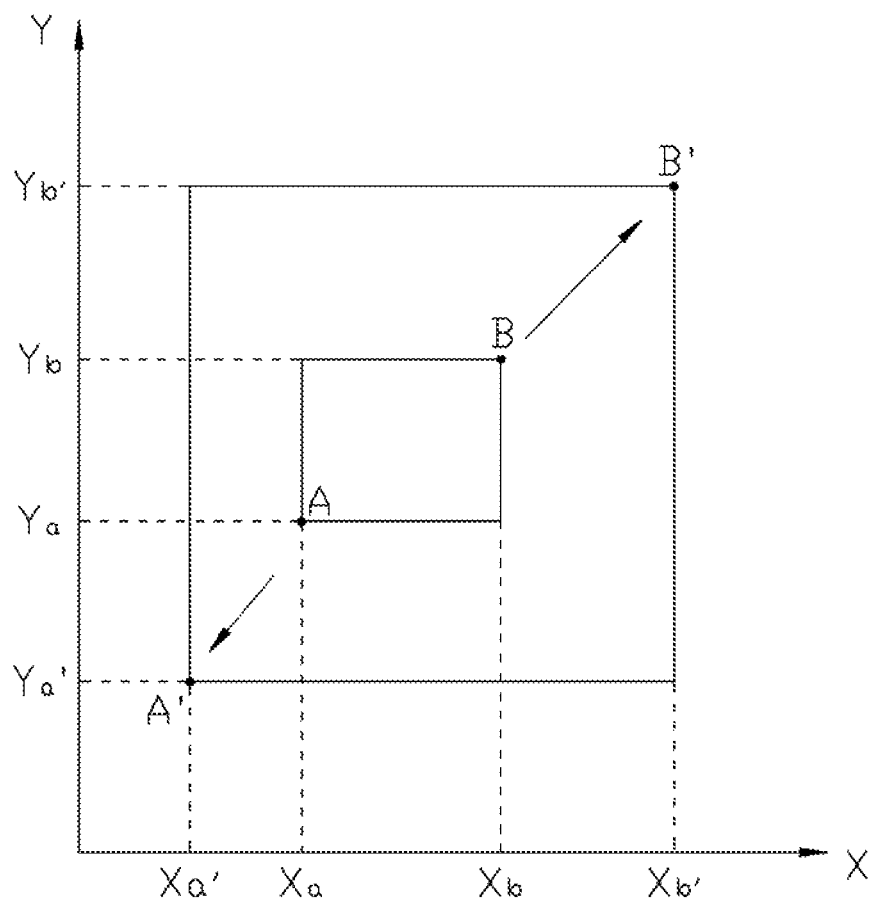
FIGS. 6 to 8 are graphs schematically demonstrating how the exemplary embodiment of the multi-touch detecting method of the present disclosure is capable of supporting different exemplary multi-touch functions implemented in the touch panel.

FIG. 6 shows "zoom-in" and "zoom-out" functions provided by the multi-touch detecting method with two two-point touches on the touch panel executed sequentially at a scanning interval. In the first two-point touch, the locations of the touched points (A, B) on the touch panel 100 on a Cartesian plane are determined to be $X_a, X_b, Y_a$ and $Y_b$, on the basis of which a first rectangle can be drawn. In the second two-point touch, the locations of the touched points (A', B') on the touch panel 100 on the Cartesian plane are determined to be $X_a', X_b', Y_a'$ and $Y_b'$, on the basis of which a second rectangle, enlarged in area from the first rectangle, can be drawn. As such, the "zoom-in" function can be triggered by first executing the first two-point touch and then executing the second two-point touch, and the "zoom-out" function can be triggered by first executing the second two-point touch and then executing the first two-point touch.

Figure 7:
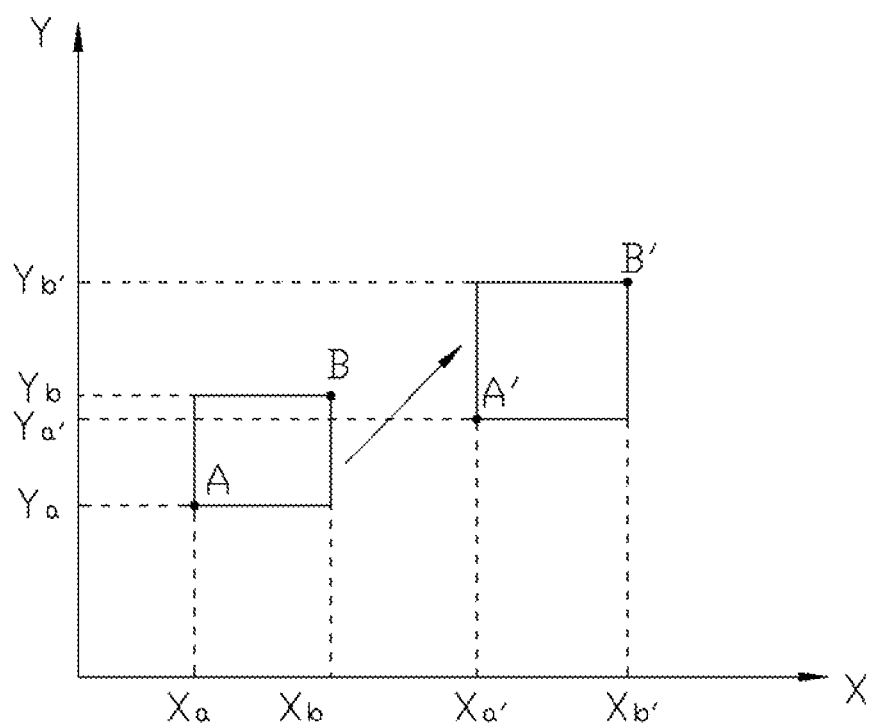

FIG. 7 shows a "translation" function provided by the multi-touch detecting method with two two-point touches on the touch panel executed sequentially at a scanning interval. In the first two-point touch, the locations of the touched points (A, B) on the touch panel 100 on a Cartesian plane are determined to be $X_a, X_b, Y_a$ and $Y_b$, on the basis of which a first rectangle can be drawn. In the second two-point touch, the locations of the touched points (A', B') on the touch panel 100 on the Cartesian plane are determined to be $X_a', X_b', Y_a'$ and $Y_b'$, one the basis of which a second rectangle, substantially the same as and spaced apart from the first rectangle, can be drawn. As such, the "translation" function can be triggered by executing the first and second two-point touches sequentially.

Figure 8:
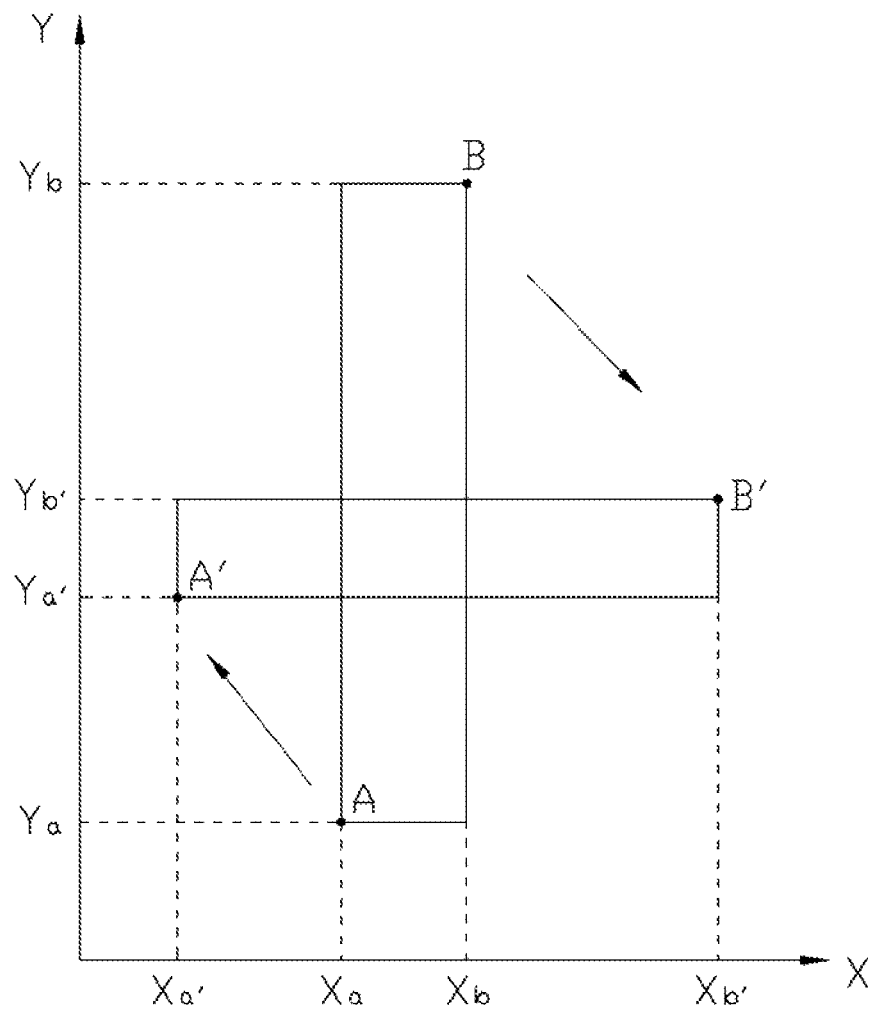

FIG. 8 shows a "rotation" function provided by the multi-touch detecting method with two two-point touches on the touch panel executed sequentially at a scanning interval. In the first two-point touch, the locations of the touched points (A, B) on the touch panel 100 on a Cartesian plane are determined to be $X_a, X_b, Y_a$ and $Y_b$, on the basis of which a first rectangle can be drawn. In the second two-point touch, the locations of the touched points (A', B') on the touch panel 100 on the Cartesian plane are determined to be $X_a', X_b', Y_a'$ and $Y_b'$, on the basis of which a second rectangle, substantially the same as the first rectangle and rotated 90 degrees relative to the first rectangle, can be drawn. As such, the "rotation" function can be triggered by executing the first and second two-point touches sequentially.

In sum, with the use of the first and second conductive films 113, 123 exhibiting electrical anisotropy, the structure of the touch panel 100 is simple and the multi-touch detecting method implemented by the touch panel 100 is simple.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

What is claimed is:

1. A multi-touch detecting method adapted for detecting touched points on a touch panel, the touch panel including first and second conductive films insulated from each other and coupled electrically to each other through touch, the first conductive film exhibiting electric anisotropy, and having a lower resistivity in a first direction, the multi-touch detecting method comprising:

applying a first voltage to the first conductive film;

applying a second voltage greater than the first voltage to the second conductive film;

obtaining a first local maximum voltage, a second local maximum voltage and a local minimum voltage from voltages measured at a plurality of different measuring points of the first conductive film, the measuring point corresponding to the local minimum voltage being located between the measuring point corresponding to the first local maximum voltage and the measuring point corresponding to the second local maximum voltage;

determining a first location of the touched points in a second direction transverse to the first direction based on a location of the measuring point corresponding to the first local maximum voltage in the second direction; and determining a second location of the touched points in the second direction based on a location of the measuring point corresponding to the second local maximum voltage in the second direction.

2. The multi-touch detecting method of claim 1, wherein the voltages are measured in such a manner that while each of the plurality of measuring points is measured, the first voltage is applied to the rest of the plurality of measuring points.

3. The multi-touch detecting method of claim 1, wherein the first local maximum voltage $V_n$ is measured at the $n^{th}$ measuring point, the first location of the touched points $X_a$ being determined by one of the following equations according to a respective one of the following conditions:

$$\text{if } V_{n-1} < V_{n+1}, \text{ then } X_a = X_n + \frac{P_x}{2} \times \frac{V_{n+1} - V_{n-1}}{V_n - V_{n-1}};$$

$$\text{if } V_{n-1} = V_{n+1}, \text{ then } X_a = X_n; \text{ and}$$

$$\text{if } V_{n-1} > V_{n+1}, \text{ then } X_a = X_n + \frac{P_x}{2} \times \frac{V_{n+1} - V_{n-1}}{V_n - V_{n+1}};$$

where $n \geq 2$, $V_{n-1}$ is the voltage measured at the $n-1^{th}$ measuring point, $V_{n-1}$ is the voltage measured at the $n+1^{th}$ measuring point, $X_n$ is the location of the $n^{th}$ measuring point in the second direction, and $P_x$ is a distance between two adjacent ones of the measuring points.

4. The multi-touch detecting method of claim 3, wherein the second local maximum voltage $V_m$ is measured at the $m^{th}$ measuring point, the second location of the touched points $X_b$ being determined by one of the following equations according to a respective one of the following conditions:

$$\text{if } V_{m-1} < V_{m+1}, \text{ then } X_b = X_m + \frac{P_x}{2} \times \frac{V_{m+1} - V_{m-1}}{V_m - V_{m-1}};$$

$$\text{if } V_{m-1} = V_{m+1}, \text{ then } X_b = X_m; \text{ and}$$

$$\text{if } V_{m-1} > V_{m+1}, \text{ then } X_b = X_m + \frac{P_x}{2} \times \frac{V_{m+1} - V_{m-1}}{V_m - V_{m+1}};$$

where $m \geq n+3$, $V_{m-1}$ is the voltage measured at the $m-1^{th}$ measuring point, $V_{m+1}$ is the voltage measured at the $m+1^{th}$ measuring point, and $X_m$ is the location of the $m^{th}$ measuring point in the second direction.

5. The multi-touch detecting method of claim 1, wherein the first local maximum voltage $V_n$ is measured at the $n^{th}$ measuring point, the second local maximum voltage $V_m$ being measured at the $m^{th}$ measuring point, the first location of the touched points $X_a$ and the second location of the touched points $X_b$ being determined by the following equations according to respective ones of the following conditions:

$$V'_{n+1} = (V_{n+1} - V_a) \times \frac{(V_n - V_a) \times (V_n - V_{n-1})}{(V_n - V_a) \times (V_n - V_{n-1}) + (V_m - V_a) \times (V_m - V_{m+1})} + V_a;$$

$$V''_{m-1} = (V_{n+1} - V_a) \times \frac{(V_m - V_a) \times (V_m - V_{m+1})}{(V_n - V_a) \times (V_n - V_{n-1}) + (V_m - V_a) \times (V_m - V_{m+1})} + V_a;$$

$$\text{if } V_{n-1} < V'_{n+1}, \text{ then } X_a = X_n + \frac{P_x}{2} \times \frac{V'_{n+1} - V_{n-1}}{V_n - V_{n-1}};$$

$$\text{if } V_{n-1} = V'_{n+1}, \text{ then } X_a = X_n;$$

$$\text{if } V_{n-1} > V'_{n+1}, \text{ then } X_a = X_n + \frac{P_x}{2} \times \frac{V'_{n+1} - V_{n-1}}{V_n - V'_{n+1}};$$

$$\text{if } V''_{m-1} < V_{m+1}, \text{ then } X_b = X_m + \frac{P_x}{2} \times \frac{V_{m+1} - V''_{m-1}}{V_m - V''_{m-1}};$$

$$\text{if } V''_{m-1} = V_{m+1}, \text{ then } X_b = X_m; \text{ and}$$

$$\text{if } V''_{m-1} > V_{m+1}, \text{ then } X_b = X_m + \frac{P_x}{2} \times \frac{V_{m+1} - V''_{m-1}}{V_m - V_{m+1}};$$

where $n \geq 2$, $m = n+2$, $V_a$ is the first voltage, $V_{n-1}$ is the voltage measured at the $n-1^{th}$ measuring point, $V_{n-1}$ is the voltage measured at the $n+1^{th}$ measuring point, $V_{m+1}$ is the voltage measured at the $m+1^{th}$ measuring point, $X_n$ is the location of the $n^{th}$ measuring point in the second direction, $X_m$ is the location of the $m^{th}$ measuring point in the second direction, and $P_x$ is a distance between two adjacent ones of the measuring points.

6. The multi-touch detecting method of claim 1, the second conductive film exhibiting electric anisotropy, and having a lower resistivity in the second direction, the multi-touch detecting method further comprising:

measuring sequentially voltages at a plurality of different measuring points of the second conductive film;

obtaining a first local minimum voltage, a second local minimum voltage and a local maximum voltage from the voltages measured at the different measuring points of the second conductive film, the measuring point corresponding to the local maximum voltage being located between the measuring point corresponding to the first local minimum voltage and the measuring point corresponding to the second local minimum voltage;

determining a first location of the touched points in the first direction based on a location of the measuring point corresponding to the first local minimum voltage in the first direction; and determining a second location of the touched points in the first direction based on a location of the measuring point corresponding to the second local minimum voltage in the first direction.

7. The multi-touch detecting method of claim 6, wherein the voltages measured at the different measuring points of the second conductive film are measured in such a manner that while each of the plurality of measuring points is measured, the second voltage is applied to the rest of the plurality of measuring points.

8. The multi-touch detecting method of claim 6, wherein the first local minimum voltage $V_s$ is measured at the $s^{th}$ measuring point of the second conductive film, the first location of the touched points in the first direction $Y_a$ being determined by one of the following equations according to a respective one of the following conditions:

$$\text{if } V_{s-1} < V_{s+1}, \text{ then } Y_a = Y_s + \frac{P_y}{2} \times \frac{V_{s-1} - V_{s+1}}{V_{s+1} - V_s};$$

$$\text{if } V_{s-1} = V_{s+1}, \text{ then } Y_a = Y_s; \text{ and}$$

$$\text{if } V_{s-1} > V_{s+1}, \text{ then } Y_a = Y_s + \frac{P_y}{2} \times \frac{V_{s-1} - V_{s+1}}{V_{s-1} - V_s};$$

where $s \geq 2$, $V_{s-1}$ is the voltage measured at the $s{-}1^{th}$ measuring point of the second conductive film, $V_{s+1}$ is the voltage measured at the $s{+}1^{th}$ measuring point of the second conductive film, $Y_s$ is the location of the $s^{th}$ measuring point of the second conductive film in the first direction, and $P_y$ is a distance between two adjacent ones of the measuring points of the second conductive film.

9. The multi-touch detecting method of claim 8, wherein the second local minimum voltage $V_t$ is measured at the $t^{th}$ measuring point of the second conductive film, the second location of the touched points in the first direction $Y_b$ being determined by one of the following equations according to a respective one of the following conditions:

$$\text{if } V_{t-1} < V_{t+1}, \text{ then } Y_b = Y_t + \frac{P_y}{2} \times \frac{V_{t-1} - V_{t+1}}{V_{t+1} - V_t};$$

$$\text{if } V_{t-1} = V_{t+1}, \text{ then } Y_b = Y_t; \text{ and}$$

$$\text{if } V_{t-1} > V_{t+1}, \text{ then } Y_b = Y_t + \frac{P_y}{2} \times \frac{V_{t-1} - V_{t+1}}{V_{t-1} - V_t};$$

where $t \geq s+3$, $V_{t-1}$ is the voltage measured at the $t{-}1^{th}$ measuring point of the second conductive film, $V_{t+1}$ is the voltage measured at the $t{+}1^{th}$ measuring point of the second conductive film, and $Y_t$ is the location of the $t^{th}$ measuring point of the second conductive film in the first direction.

10. The multi-touch detecting method of claim 6, wherein the first local minimum voltage $V_s$ is measured at the $s^{th}$ measuring point of the second conductive film, the second local minimum voltage $V_t$ being measured at the $t^{th}$ measuring point of the second conductive film, the first location of the touched points in the first direction $Y_a$ and the second location of the touched points in the first direction $Y_b$ being determined by the following equations according to respective ones of the following conditions:

$$V'_{s+1} = V_b - (V_b - V_{s+1}) \times \frac{(V_b - V_s) \times (V_{s-1} - V_s)}{(V_b - V_s) \times (V_{s-1} - V_s) + (V_b - V_t) \times (V_{t+1} - V_t)};$$

$$V''_{t-1} = V_b - (V_b - V_{s+1}) \times \frac{(V_b - V_t) \times (V_{t+1} - V_t)}{(V_b - V_s) \times (V_{s-1} - V_s) + (V_b - V_t) \times (V_{t+1} - V_t)};$$

$$\text{if } V_{s-1} < V'_{s+1}, \text{ then } Y_a = Y_s + \frac{P_y}{2} \times \frac{V_{s-1} - V'_{s+1}}{V'_{s+1} - V_s};$$

$$\text{if } V_{s-1} = V'_{s+1}, \text{ then } Y_a = Y_s;$$

$$\text{if } V_{s-1} = V'_{s+1}, \text{ then } Y_a = Y_s + \frac{P_y}{2} \times \frac{V_{s-1} - V'_{s+1}}{V_{s-1} - V_s};$$

$$\text{if } V''_{t-1} < V_{t+1}, \text{ then } Y_b = Y_t + \frac{P_y}{2} \times \frac{V''_{t-1} - V_{t+1}}{V_{t+1} - V_t};$$

$$\text{if } V''_{t-1} = V_{t+1}, \text{ then } Y_b = Y_t; \text{ and}$$

$$\text{if } V''_{t+1} > V_{t+1}, \text{ then } Y_b = Y_t + \frac{P_y}{2} \times \frac{V''_{t-1} - V_{t+1}}{V''_{t-1} - V_t};$$

where $s \geq 2$, $t = s+2$, $V_b$ is the second voltage, $V_{s-1}$ is the voltage measured at the $s{-}1^{th}$ measuring point of the second conductive film, $V_{s+1}$ is the voltage measured at the $s{+}1^{th}$ measuring point of the second conductive film, $V_{t+1}$ is the voltage measured at the $t{+}1^{th}$ measuring point of the second conductive film, $Y_s$ is the location of the $s^{th}$ measuring point of the second conductive film in the first direction, $Y_t$ is the location of the $t^{th}$ measuring point of the second conductive film in the first direction, and $P_y$ is a distance between two adjacent ones of the measuring points of the second conductive film.

11. A multi-touch detecting method adapted for detecting touched points on a touch panel, the touch panel including first and second conductive films insulated from each other and coupled electrically to each other through touch, the second conductive film exhibiting electric anisotropy, and having a lower resistivity in a certain direction, the multi-touch detecting method comprising:

applying a first voltage to the first conductive film;

applying a second voltage greater than the first voltage to the second conductive film;

measuring sequentially voltages at different measuring points of the second conductive film;

obtaining a first local minimum voltage, a second local minimum voltage and a local maximum voltage from the voltages measured at the different measuring points of the second conductive film, the measuring point corresponding to the local maximum voltage being located between the measuring point corresponding to the first local minimum voltage and the measuring point corresponding to the second local minimum voltage;

determining a first location of the touched points based on a location of the measuring point corresponding to the first local minimum voltage; and determining a second location of the touched points based on a location of the measuring point corresponding to the second local minimum voltage.

12. The multi-touch detecting method of claim 11, wherein the first local minimum voltage $V_s$ is measured at the $s^{th}$ measuring point, the first location of the touched points $Y_a$ being determined by one of the following equations according to a respective one of the following conditions:

$$\text{if } V_{s-1} < V_{s+1}, \text{ then } Y_a = Y_s + \frac{P_y}{2} \times \frac{V_{s-1} - V_{s+1}}{V_{s+1} - V_s};$$

$$\text{if } V_{s-1} = V_{s+1}, \text{ then } Y_a = Y_s; \text{ and}$$

$$\text{if } V_{s-1} > V_{s+1}, \text{ then } Y_a = Y_s + \frac{P_y}{2} \times \frac{V_{s-1} - V_{s+1}}{V_{s-1} - V_s};$$

where $s \geq 2$, $V_{s-1}$ is the voltage measured at the $s{-}1^{th}$ measuring point, $V_{s+1}$ is the voltage measured at the $s{+}1^{th}$ measuring point, $Y_s$ is the location of the $s^{th}$ measuring point, and $P_y$ is a distance between two adjacent ones of the measuring points.

13. The multi-touch detecting method of claim 12, wherein the second local minimum voltage $V_t$ is measured at the $t^{th}$ measuring point, the second location of the touched points $Y_b$ being determined by one of the following equations according to if $V_{t-1} < V_{t+1}$, then $Y_b = Y_t + \frac{P_y}{2} \times \frac{V_{t-1} - V_{t+1}}{V_{t+1} - V_t}$;

if $V_{t-1} = V_{t+1}$, then $Y_b = Y_t$; and if $V_{t-1} > V_{t+1}$, then $Y_b = Y_t + \frac{P_y}{2} \times \frac{V_{t-1} - V_{t+1}}{V_{t-1} - V_t}$;

where $t \geq s+3$, $V_{t-1}$ is the voltage measured at the $t-1^{th}$ measuring point, $V_{t+1}$ is the voltage measured at the $t+1^{th}$ measuring point, and $Y_t$ is the location of the $t^{th}$ measuring point.

14. The multi-touch detecting method of claim 11, wherein the first local minimum voltage $V_s$ is measured at the $s^{th}$ measuring point, the second local minimum voltage $V_t$ being measured at the $t^{th}$ measuring point, the first location of the touched points $Y_a$ and the second location of the touched points $Y_b$ being determined by the following equations according to respective ones of the following conditions:

$$V'_{s+1} = V_b - (V_b - V_{s+1}) \times \frac{(V_b - V_s) \times (V_{s-1} - V_s)}{(V_b - V_s) \times (V_{s-1} - V_s) + (V_b - V_t) \times (V_{t+1} - V_t)};$$

$$V''_{t-1} = V_b - (V_b - V_{s+1}) \times \frac{(V_b - V_t) \times (V_{t+1} - V_t)}{(V_b - V_s) \times (V_{s-1} - V_s) + (V_b - V_t) \times (V_{t+1} - V_t)};$$

if $V_{s-1} < V'_{s+1}$, then $Y_a = Y_s + \frac{P_y}{2} \times \frac{V_{s-1} - V'_{s+1}}{V'_{s+1} - V_s}$;

if $V_{s-1} = V'_{s+1}$, then $Y_a = Y_s$;

if $V_{s-1} > V'_{s+1}$, then $Y_a = Y_s + \frac{P_y}{2} \times \frac{V_{s-1} - V'_{s+1}}{V_{s-1} - V_s}$;

if $V''_{t-1} < V_{t+1}$, then $Y_b = Y_t + \frac{P_y}{2} \times \frac{V''_{t-1} - V_{t+1}}{V_{t+1} - V_t}$;

if $V''_{t-1} = V_{t+1}$, then $Y_b = Y_t$; and if $V''_{t-1} > V_{t+1}$, then $Y_b = Y_t + \frac{P_y}{2} \times \frac{V''_{t-1} - V_{t+1}}{V''_{t-1} - V_t}$;

where $s \geq 2$, $t = s+2$, $V_b$ is the second voltage, $V_{s-1}$ is the voltage measured at the $s-1^{th}$ measuring point, $V_{s+1}$ is the voltage measured at the $s+1^{th}$ measuring point, $V_{t+1}$ is the voltage measured at the $t+1^{th}$ measuring point, $Y_s$ is the location of the $s^{th}$ measuring point, $Y_t$ is the location of the $t^{th}$ measuring point, and $P_y$ is a distance between two adjacent ones of the measuring points.

* * * * *